US012604979B2

(12) United States Patent
Herschkowitz et al.

(10) Patent No.: US 12,604,979 B2
(45) Date of Patent: Apr. 21, 2026

(54) CABINET FOR SECURE PUBLIC STORAGE OF MEDICATIONS AND RELATED DEVICES

(71) Applicant: Above the Fold, LLC, Brooklyn, NY (US)

(72) Inventors: Samuel Herschkowitz, Brooklyn, NY (US); Abby Herzig, Toronto (CA); Theodore Ulrich, New York, NY (US); Pepin S. Gelardi, New York, NY (US); Julia Timko, Brooklyn, NY (US); Man Fung Tse, New York, NY (US); Eric Freitag, Brooklyn, NY (US)

(73) Assignee: Above the Fold, LLC, Brooklyn, NY (US)

( * ) Notice: Subject to any disclaimer, the term of this patent is extended or adjusted under 35 U.S.C. 154(b) by 208 days.

(21) Appl. No.: 18/371,948

(22) Filed: Sep. 22, 2023

(65) Prior Publication Data

US 2025/0098852 A1 Mar. 27, 2025

(51) Int. Cl.
*A47B 67/02* (2006.01)
*G08B 13/196* (2006.01)

(52) U.S. Cl.
CPC ........ *A47B 67/02* (2013.01); *G08B 13/19695* (2013.01); *A47B 2067/025* (2013.01)

(58) Field of Classification Search
CPC .............. A47B 67/02; A47B 2067/025; G08B 13/19695
See application file for complete search history.

(56) References Cited

U.S. PATENT DOCUMENTS 5,451,930 A * 9/1995 McDaniel ............. F25D 29/008 340/521
2006/0237427 A1 10/2006 Logan
2013/0092702 A1 * 4/2013 Holmes ................... G07F 11/60 221/191
2014/0222194 A1 8/2014 Paradissis et al.
(Continued)

FOREIGN PATENT DOCUMENTS

CN 112284000 A * 1/2021 .............. F25D 11/00
KR 20150045713 A * 4/2015 ......... H05B 37/0245

OTHER PUBLICATIONS

International Search Report and Written Opinion mailed Dec. 6, 2024 in the corresponding International application No. PCT/US2024/047465.

*Primary Examiner* — Matthew W Ing
(74) *Attorney, Agent, or Firm* — Jon E. Gordon; Haug Partners LLP

(57) ABSTRACT

Embodiments of the invention relate to cabinets that can store medications and medical devices in public spaces and provide easy access to their contents in emergencies while also deterring theft, vandalism, and damage to the contents. These goals may be furthered in connection with, e.g., one or more electronic systems included in the cabinet. These electronic systems may, according to embodiments of the invention, provide functions related to, e.g., summoning help in emergencies, monitoring access to the cabinet, monitoring environmental conditions around and/or with the cabinet, removing and replacing medications that have reached expiry, and replacing medications that have been used or otherwise removed from the cabinet.

14 Claims, 12 Drawing Sheets

(56) References Cited

U.S. PATENT DOCUMENTS

| | | | | |
|---|---|---|---|---|
| 2015/0105903 | A1* | 4/2015 | Denny | G16H 40/67 715/740 |
| 2015/0320209 | A1* | 11/2015 | Hasselback | A47B 95/00 312/227 |
| 2016/0147977 | A1 | 5/2016 | Adams et al. | |
| 2018/0062877 | A1* | 3/2018 | Iyengar | H04L 12/6418 |
| 2021/0065887 | A1 | 3/2021 | Garg, III | |
| 2022/0022419 | A1* | 1/2022 | Garrity | G06K 19/07705 |

* cited by examiner

CABINET FOR SECURE PUBLIC STORAGE OF MEDICATIONS AND RELATED DEVICES

BACKGROUND

In emergencies, seconds can count. For example, in a patient experiencing anaphylaxis, it can be critical to administer epinephrine, e.g., from an autoinjector such as EpiPen® or Auvi-Q®, immediately. In case of an opioid overdose, prompt administration of naloxone (e.g., Narcan®) can make the difference between life and death.

(For the sake of brevity, "autoinjector" is used throughout this disclosure. Except where required by context, however, any reference to an autoinjector can include any container of medication and/or device for administration of medication. Also for brevity, the medications, containers, and forms of administration may be referred to collectively as "medications".)

People who know that they may be susceptible to anaphylaxis may carry their own autoinjectors. But autoinjectors are not always kept up to date and, in some environments (e.g., day care centers), caregivers may be forbidden, e.g., by law, regulation, or policy, to administer medication from an autoinjector that is even one day past its expiration date. The safety and efficacy of some medications and/or devices for their administration can be degraded, e.g., by environmental factors, such as being too hot or too cold. Further, not everyone who has a life-threatening allergy knows it.

Making autoinjectors widely available in public places—and ensuring that they can be used safely, effectively, and legally—can therefore save lives.

One way to improve the public availability of autoinjectors is simply to distribute them to appropriate people (e.g., administrators, school nurses, or teachers) in public facilities. But this kind of distribution runs the risk that an autoinjector may be, e.g., locked in a drawer, with no key to be found in an emergency. It also adds complexity to keeping track of expiration dates and replacing expired medications.

Making medications more publicly available poses challenges, too. The cost of the medications may provide incentives to theft. And vandalism is always a possibility. These challenges may themselves frustrate those who would in some way make medications more easily accessible. And as described above, countermeasures to theft and vandalism (e.g., keeping medications in a locked cabinet in a public place) can also frustrate the purposes that led to making the medications more widely available in the first place.

There is therefore a need for devices, systems, and methods that can promote the availability of life-saving drugs and/or devices, keeping in mind the need for easy public access, the threats to such access posed by, e.g., theft and vandalism, and ensuring safety and compliance with applicable laws and regulations.

BRIEF SUMMARY OF THE INVENTION

Embodiments of the invention relate to cabinets that can store medications and medical devices in public spaces and provide easy access to their contents in emergencies while also deterring theft, vandalism, and damage to the contents. These goals may be furthered in connection with, e.g., one or more electronic systems included in the cabinet. These electronic systems may, according to embodiments of the invention, provide functions related to, e.g., summoning help in emergencies, monitoring access to the cabinet, monitoring environmental conditions around and/or with the cabinet, removing and replacing medications that have reached expiry, and replacing medications that have been used or otherwise removed from the cabinet.

In an embodiment of the invention, a cabinet for secure public storage of medication comprises a body comprising a storage compartment, the storage compartment having a front and a bottom; one or more trays disposed at the bottom of a storage compartment, each of the trays being configured to hold respectively one or more medication containers; a cover movably attached to the body such that the cover has a closed position preventing removal of medication containers from the storage compartment and an open position permitting removal of medication containers from the storage compartment; a microcontroller disposed within the body; a cover-position sensor disposed within the body and configured to detect whether the cover is or is not in the closed position, the cover-position sensor being operatively coupled to the microcontroller; an audio output device operatively coupled to the microcontroller; and one or more lights operatively coupled to the microcontroller.

In such an embodiment, the cabinet further comprises a video camera configured to participate in a data network; and a motion sensor operatively coupled to the video camera, the motion sensor configured to detect motion of the cover and/or motion in front of the cabinet, wherein the video camera is configured to be activated upon detection of motion by the motion sensor and, while active, to transmit still and/or moving images via the electronic data network.

According to an embodiment, the microcontroller is programmed at least to: recognize an armed state and an emergency mode; transition from the armed state to the emergency mode upon receipt, while in the armed state, of input from the cover-position sensor indicating that the cover is in the open position; and while in the emergency mode, cause the audio output device to emit a siren and cause the lights to flash brightly.

According to a further embodiment, the microcontroller is programmed at least to: recognize a maintenance-needed state; transition from the emergency mode to the maintenance-needed state upon, while in the emergency mode, an event occurring from the group consisting of elapsing of a preset time since entry of emergency mode, and receiving input from the cover-position sensor indicating that the cover is in the closed position. Upon entry into the maintenance-needed state, the audio output device ceases to emit the siren of the emergency mode, the lights cease the bright flashing of the emergency mode, and the cabinet emits one or more visual and/or auditory signals indicating the maintenance-needed state. These visual and/or auditory signals are perceptibly distinct from the siren of the emergency mode and the bright flashing of the emergency mode.

According to a still further embodiment, the cabinet comprises a magnetic sensor operatively coupled to the microcontroller and configured to detect a magnetic wand in proximity to the cabinet. The microcontroller is programmed at least to transition from the maintenance-needed state to the armed state upon receiving, while in the maintenance-needed state, input indicating that the magnetic sensor has detected the magnetic wand.

According to an embodiment, the cabinet comprises a magnetic sensor operatively coupled to the microcontroller and configured to detect a magnetic wand in proximity to the cabinet. In such an embodiment, the microcontroller is programmed at least to: recognize a maintenance-needed state; transition from the emergency mode to the maintenance-needed state upon, while in the emergency mode, an event occurring from the group consisting of elapsing of a preset time since entry of emergency mode, receiving input indicating that the magnetic sensor has detected the magnetic wand, and receiving input from the cover-position sensor indicating that the cover is in the closed position. Upon entry into the maintenance-needed state, the audio output device ceases to emit the siren of the emergency mode, the lights cease the bright flashing of the emergency mode, and the cabinet emits one or more visual and/or auditory signals indicating the maintenance-needed state, the visual and/or auditory signals being perceptibly distinct from the siren of the emergency mode and the bright flashing of the emergency mode.

According to a further embodiment, the microcontroller is programmed at least to transition from the maintenance-needed state to the armed state upon receiving, while in the maintenance-needed state, input indicating that the magnetic sensor has detected the magnetic wand.

According to an embodiment, at least one of the trays is modular and removably fastened to the body.

According to a further embodiment, the microcontroller is programmed at least to: recognize an armed state and an emergency mode; transition from the armed state to the emergency mode upon receipt, while in the armed state, of input from the cover-position sensor indicating that the cover is in the open position; and while in the emergency mode, cause the audio output device to emit a siren and cause the lights to flash brightly.

According to a still further embodiment, the cabinet comprises a magnetic sensor operatively coupled to the microcontroller and configured to detect a magnetic wand in proximity to the cabinet. In the embodiment, the microcontroller is programmed at least to: recognize a maintenance-needed state; transition from the emergency mode to the maintenance-needed state upon, while in the emergency mode, an event occurring from the group consisting of elapsing of a preset time since entry of emergency mode, receiving input indicating that the magnetic sensor has detected the magnetic wand, and receiving input from the cover-position sensor indicating that the cover is in the closed position. Upon entry into the maintenance-needed state, the audio output device ceases to emit the siren of the emergency mode, the lights cease the bright flashing of the emergency mode, and the cabinet emits one or more visual and/or auditory signals indicating the maintenance-needed state, the visual and/or auditory signals being perceptibly distinct from the siren of the emergency mode and the bright flashing of the emergency mode.

According to a still further embodiment, the microcontroller is programmed at least to transition from the maintenance-needed state to the armed state upon receiving, while in the maintenance-needed state, input indicating that the magnetic sensor has detected the magnetic wand.

According to an embodiment, the cabinet comprises a temperature sensor operatively coupled to the microcontroller. The microcontroller is programmed at least to detect a temperature excursion comprising measurement by the temperature sensor of a temperature outside a preset range.

According to a further embodiment, the microcontroller is programmed at least to, upon detection of the temperature excursion, cause the cabinet to emit a first one or more visual and/or auditory signals indicating the temperature excursion. According to a still further embodiment, the microcontroller is programmed at least to detect termination of the temperature excursion and, following the detection of the termination of the temperature excursion, cause the cabinet to emit a second one or more visual and/or auditory signals indicating the termination of the temperature excursion. Some or all of the first one or more visual and/or auditory signals may be the same as some or all of the second one or more visual and/or auditory signals, but some or all of the first one or more visual and/or auditory signals may be different from some or all of the second one or more visual and/or auditory signals.

According to a further embodiment, the cabinet comprises a network interface operatively coupled to the microcontroller. The microcontroller is programmed at least to participate in an electronic data network via the network interface; communicate via the electronic data network with at least one server; and upon detection of the temperature excursion, transmit to the at least one server data indicating the temperature excursion.

DETAILED DESCRIPTION OF PREFERRED EMBODIMENTS

Figure 1:
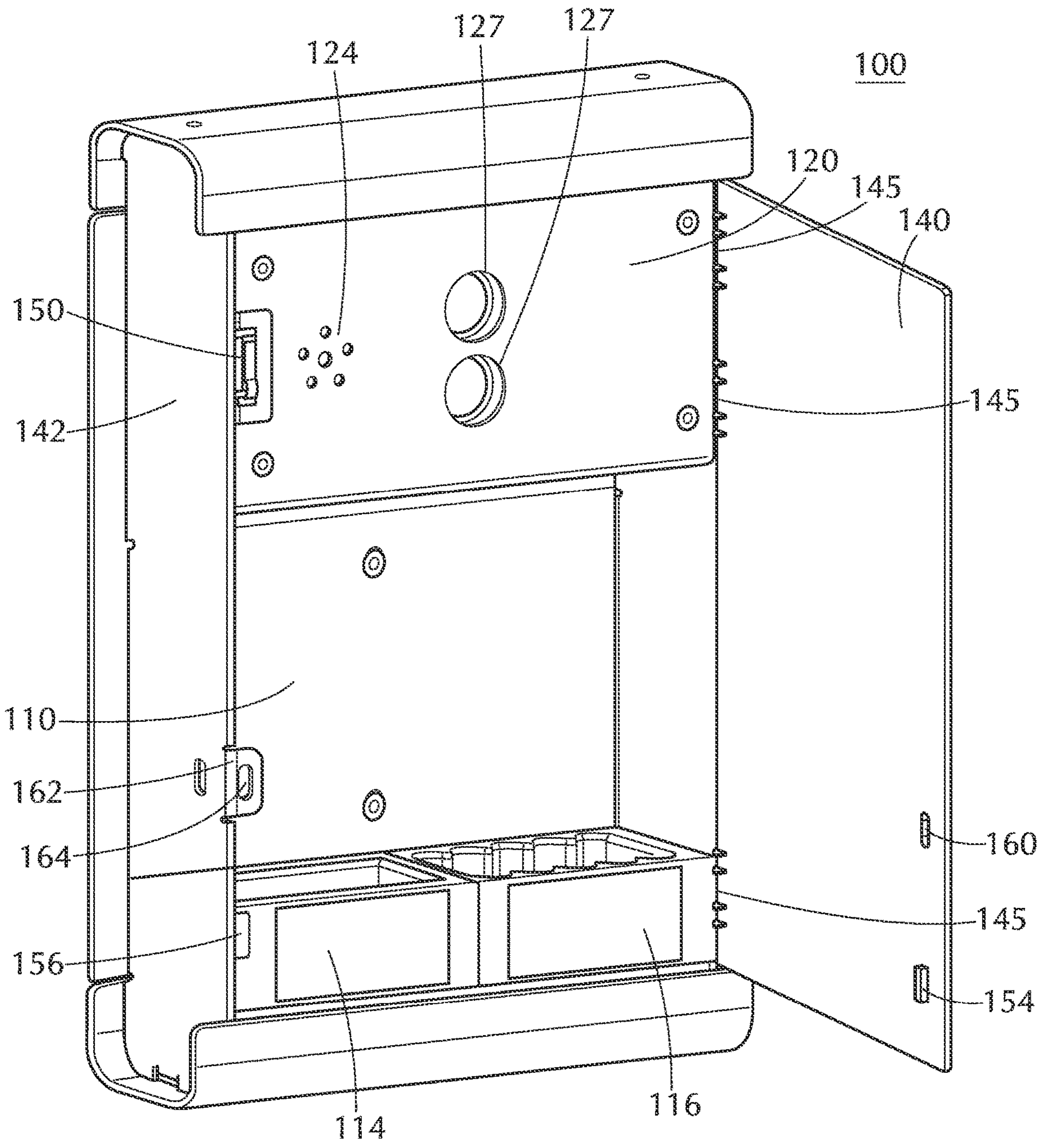
FIG. 1 is a perspective view of a secure public storage cabinet according to an embodiment of the invention, with a cover in an open position.

FIG. 1 depicts a cabinet 100 for secure storage of medication containers according to an embodiment of the invention. The depicted cabinet 100 includes a storage compartment 110. As depicted, the cabinet 100 includes within the storage compartment 110 two trays 114, 116 for holding medication containers (not pictured).

A cabinet 100 according to embodiments of the invention may have various features to secure the cabinet 100, its contents, or both. In embodiments, those features may include, e.g., one or more sensors and additional assemblies. In a cabinet 100 such as FIG. 1 depicts, some or all of the sensors and assemblies may be, e.g., behind a protective plate 120. The protective plate 120 as depicted includes a speaker grille 124 and two openings 127 for, e.g., a video camera, motion sensor, or other sensor or device.

Figure 2:
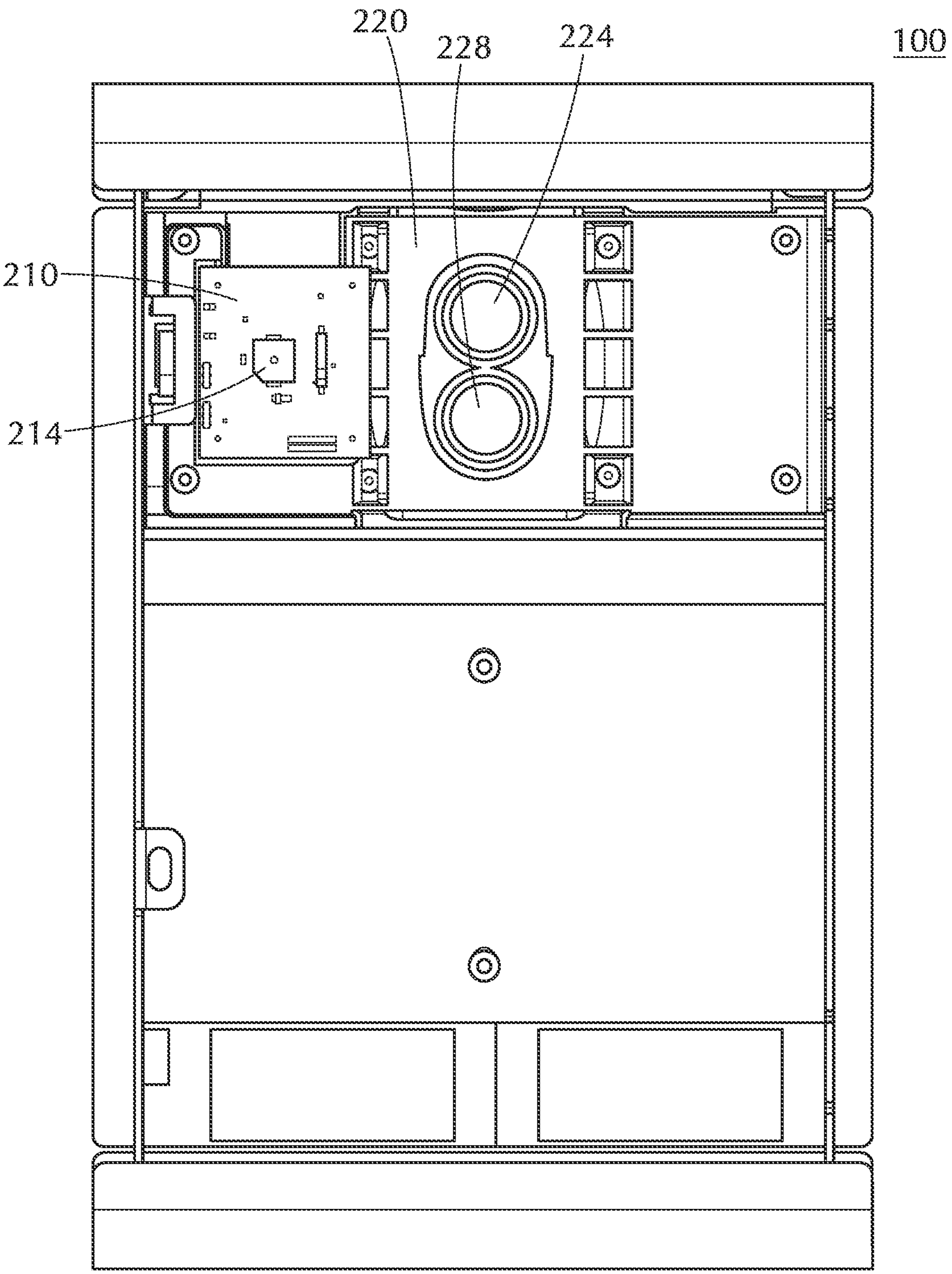
FIG. 2 depicts a layout of components within a secure public storage cabinet according to an embodiment of the invention.

FIG. 2 shows an example of a layout of components behind a plate 120 (FIG. 1) according to an embodiment of the invention. As depicted printed circuit board 210 (FIG. 2) includes a buzzer 214 or other audio output device. A standalone WiFi video camera 220 is installed according to the depicted embodiment and, as depicted, may include, e.g., both a camera 224 and a motion sensor 228. The video camera 220 may incorporate, e.g., one or more light sources (not pictured) such as infrared LEDs (if accompanying a video camera that is sensitive to IR light).

Returning to FIG. 1, one or more lights may be disposed in or on various parts of the cabinet 100. For example, in one embodiment of the invention, one or more LEDs in one or more colors may be placed, e.g., at or embedded in the bottom of the compartment containing sensors and additional assemblies (this being, e.g., the compartment behind plate 120). In addition to or instead of such LEDs, according to alternative embodiments of the invention, one or more lights (not pictured) may be disposed, e.g., on the upper surface and/or sides of the cabinet 100 and may, e.g., be easily visible at a distance.

Figure 3:
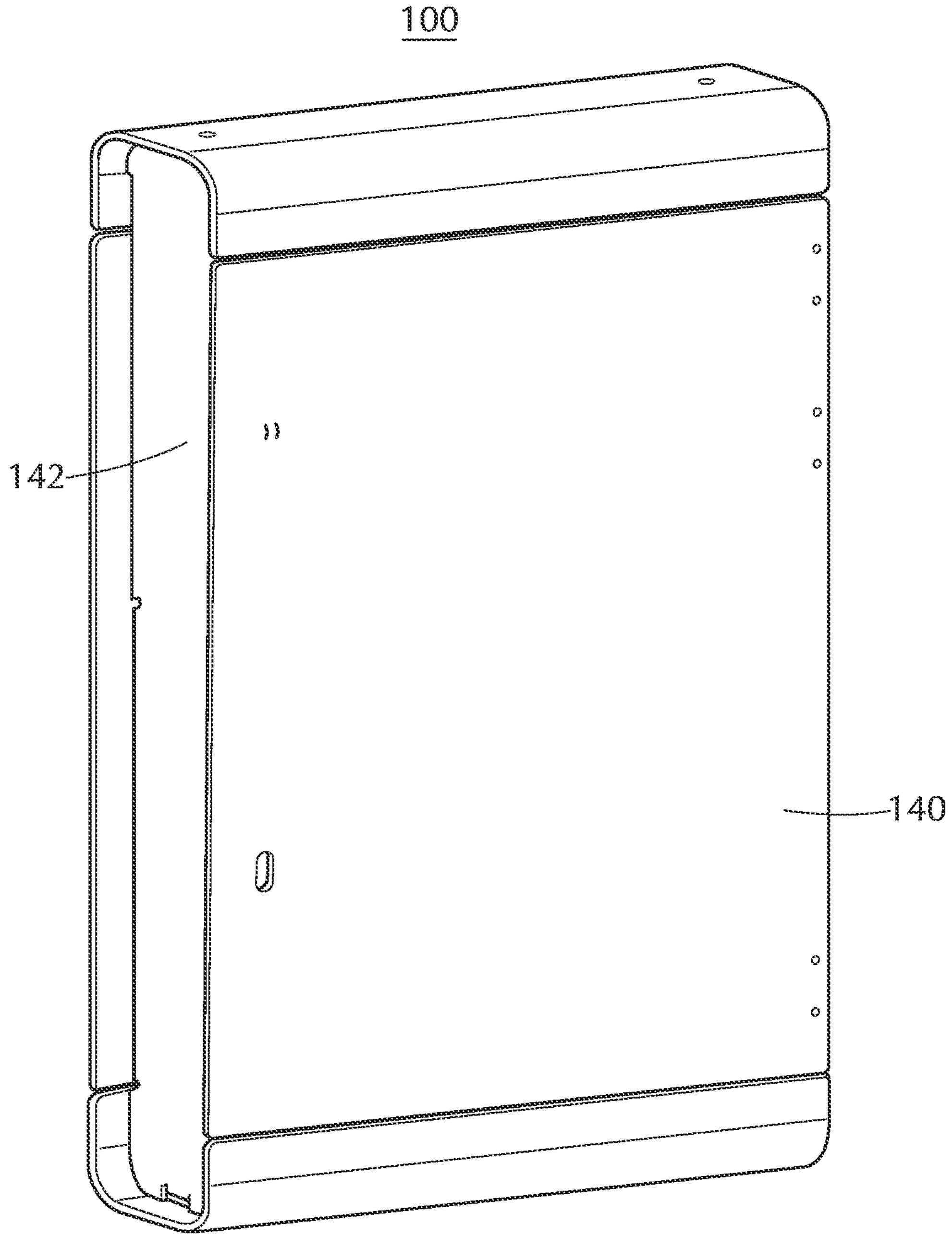
FIG. 3 is a perspective view of a secure public storage cabinet according to an embodiment of the invention, with a cover in a closed position.

The storage compartment 110 may be secured, e.g., by a cover 140 that is movably attached to the body 142 of the cabinet, e.g., by one or more hinges 145. FIG. 1 depicts the cover 140 in an open position according to an embodiment of the invention, which allows access to the storage compartment 110 and its contents. FIG. 3 depicts the embodiment of FIG. 1 with the cover 140 in a closed position that prevents access to the inside of the cabinet 100.

A cabinet 100 according to embodiments of the invention may include, e.g., a component configured to detect whether the cover is open or closed. For example, in an embodiment such as FIG. 1 depicts, a mechanical switch 150 may be placed so that it is in a first position when the cover 140 is closed and a second, different position when the cover 140 is open, such that any change between the two positions changes, e.g., the electrical conduction of the switch 150, thereby causing the switch 150 to indicate whether the cover 140 is open or closed.

In other embodiments of the invention, the state of the cover (viz., open or closed) may be detected in other ways instead of or in addition to a mechanical switch 150. Magnetic and optical sensors (not pictured) are just two examples out of many suitable devices that may serve this function according to embodiments of the invention.

As FIG. 1 depicts, a cover 140 according to an embodiment of the invention may include, e.g., one or more magnets 154 corresponding to one or more magnetic tabs 156 within the body 142 of the cabinet 100, which may hold the cover 140 closed.

According to an embodiment of the invention, the cover 140 may have, e.g., a slot 160 corresponding to a tab 162 that extends from the body 142. When the cover 140 is closed, the tab 162 may project through the slot 160, and the portion of the tab 162 that extends through the slot 160 may include, e.g., some or all of a hole 164 in the tab 162. A tamper-evident seal (not pictured) may then be placed through the hole 164, making it easier to notice afterwards if the cover 140 has been opened.

Figure 4:
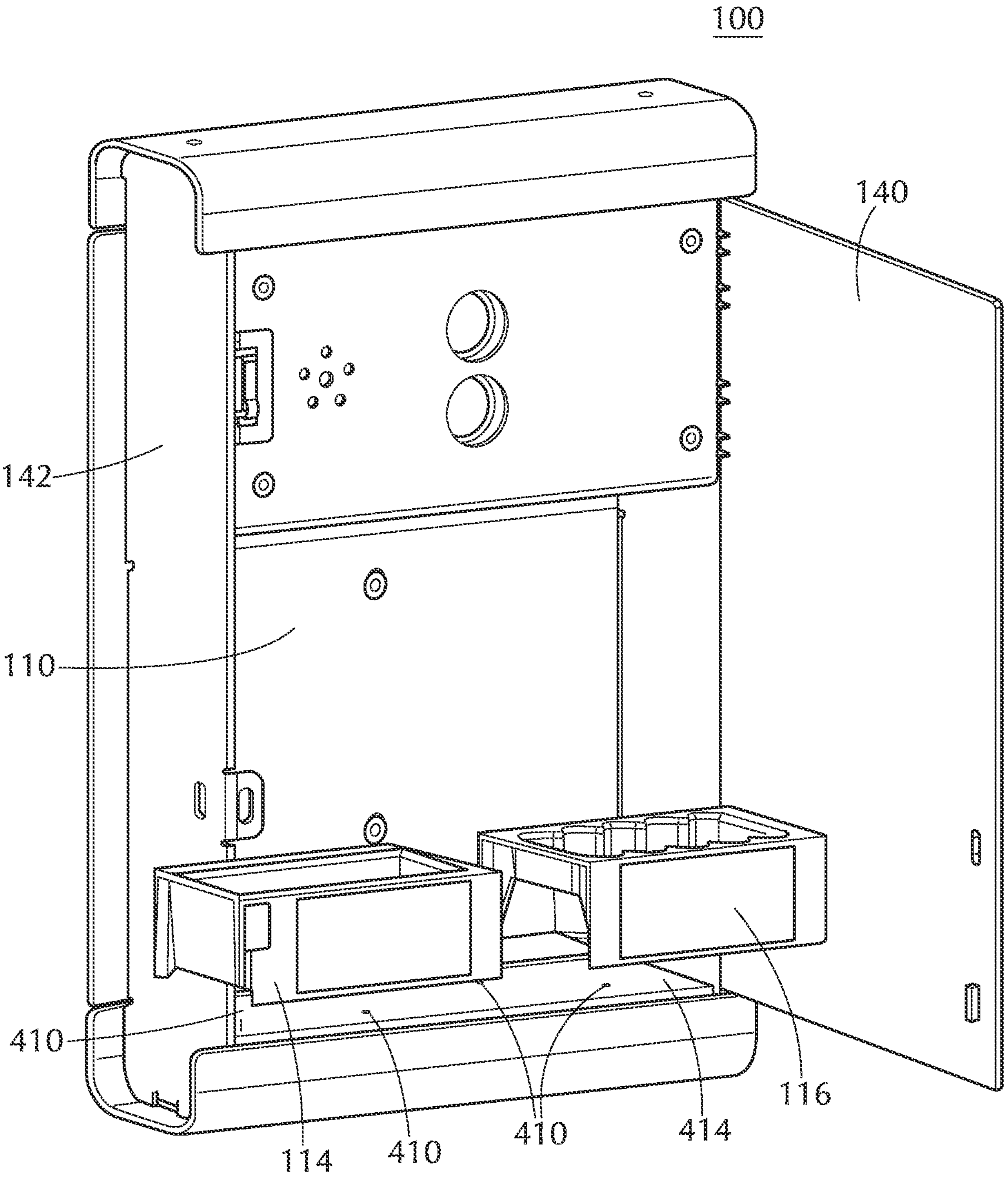
FIG. 4 is a partial exploded perspective view of a secure public storage cabinet according to an embodiment of the invention.

According to embodiments of the invention, the trays 114, 116 may be, e.g., removably fastened to the body 142. FIG. 4 depicts a partial exploded view of a cabinet 100 according to an embodiment of the invention, showing removed trays 114, 116 in relation to a body 142 of a cabinet 100.

Figure 5:
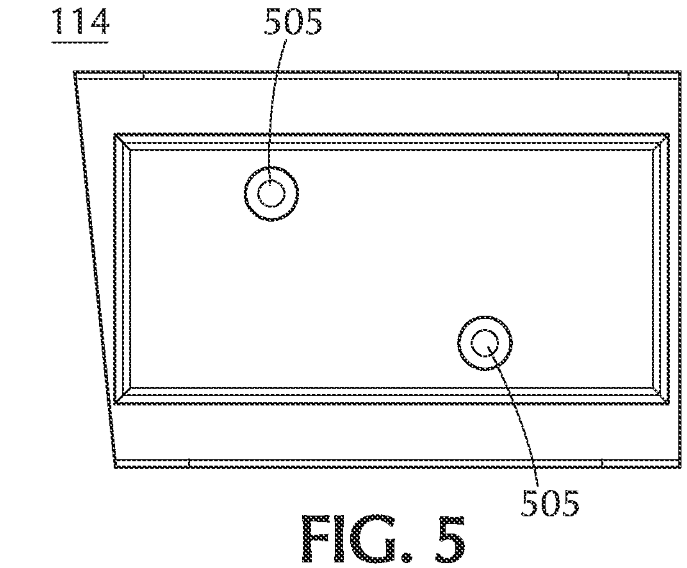
FIG. 5 depicts a tray suitable for holding Narcan® containers within a secure public storage cabinet according to an embodiment of the invention.
Figure 6:
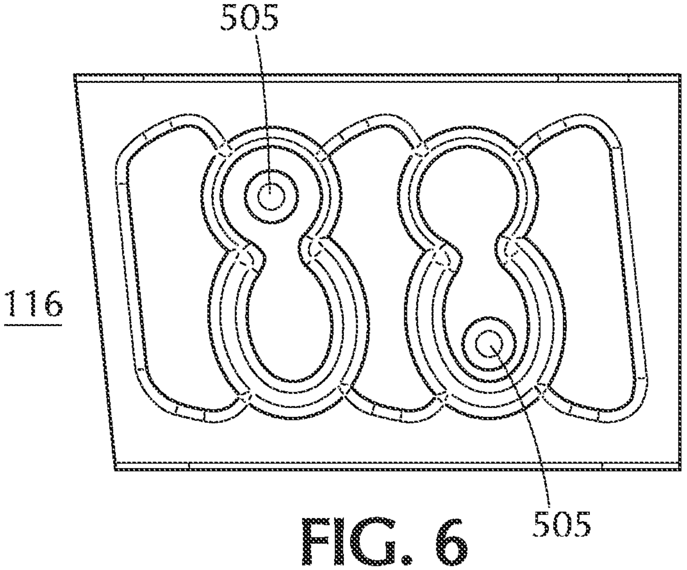
FIG. 6 depicts a tray suitable for holding emergency autoinjectors within a secure public storage cabinet according to an embodiment of the invention.
Figure 7:
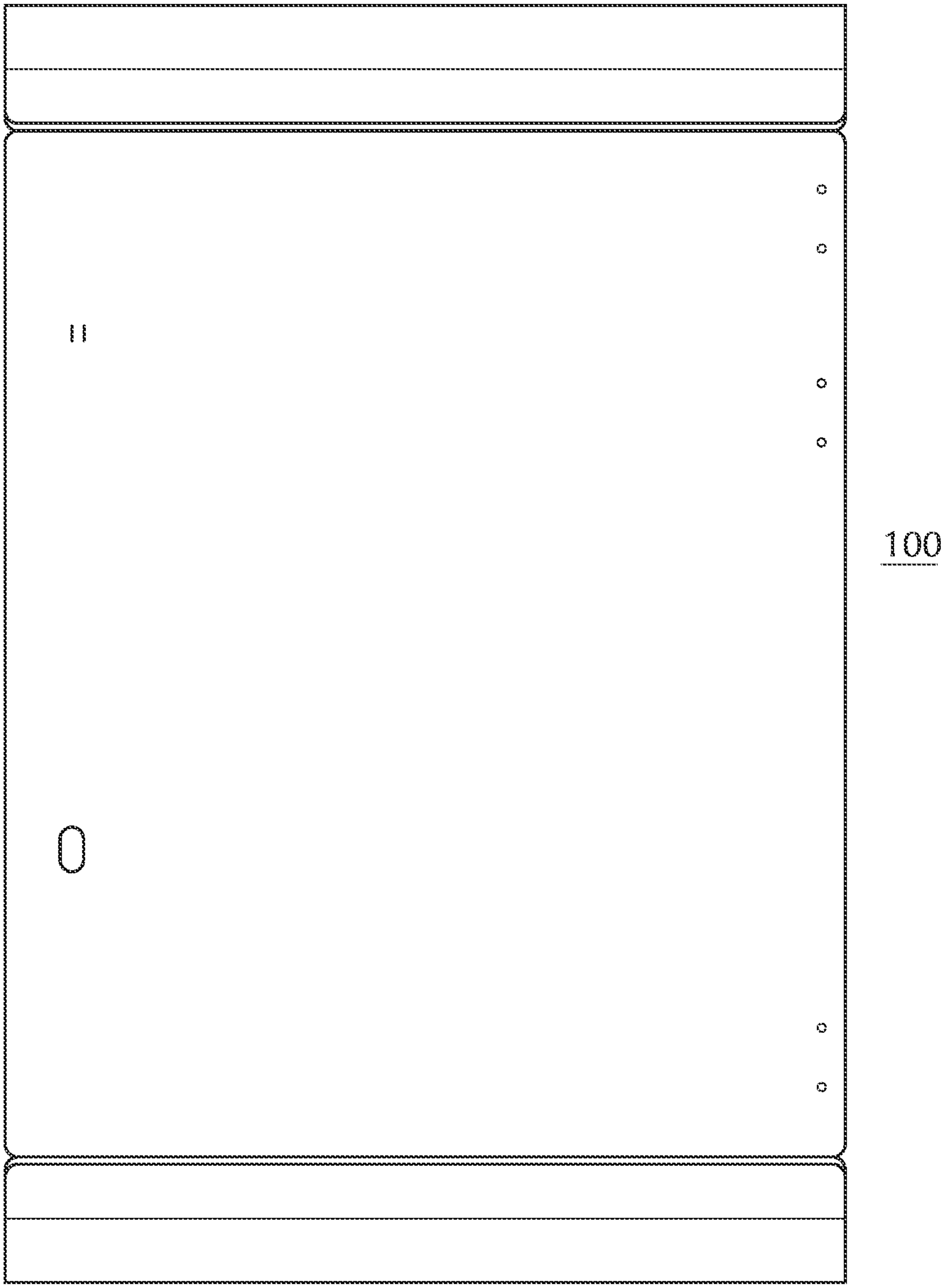
FIG. 7 is a front view of a secure public storage cabinet according to an embodiment of the invention.
Figure 8:
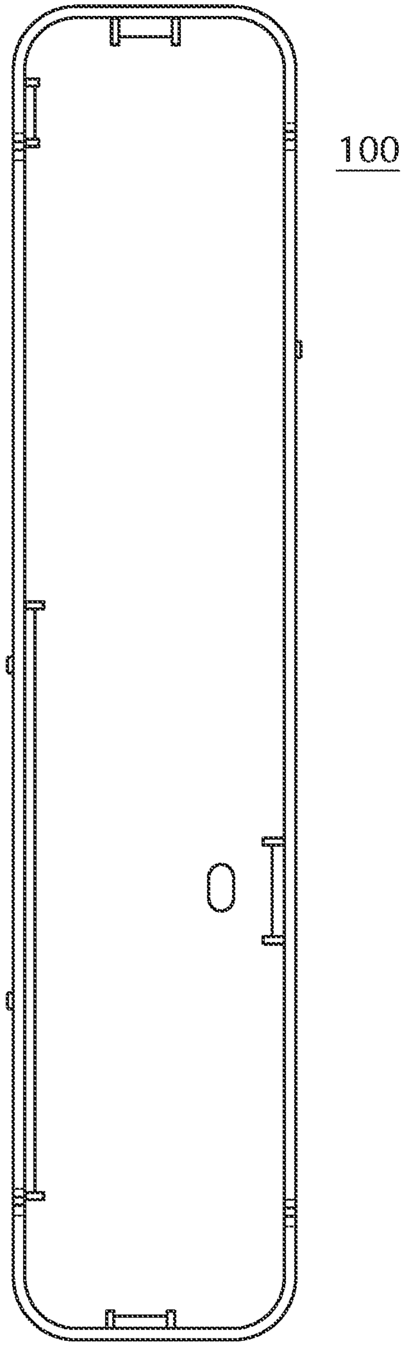
FIG. 8 is a left side view of a secure public storage cabinet according to an embodiment of the invention.
Figure 9:
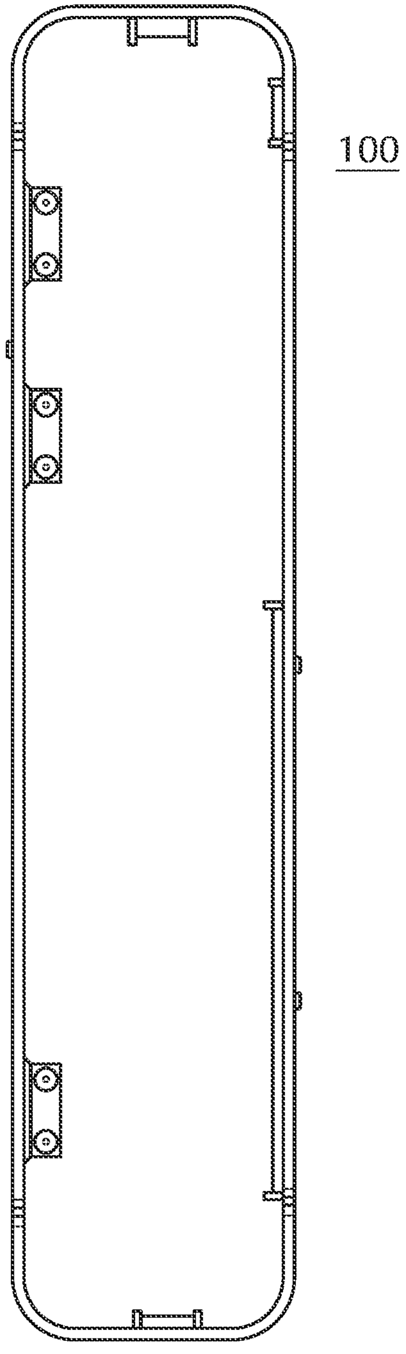
FIG. 9 is a right side view of a secure public storage cabinet according to an embodiment of the invention.
Figure 10:
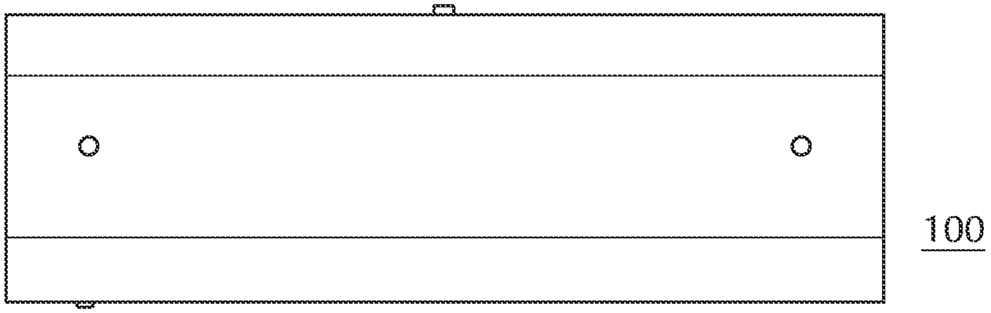
FIG. 10 is a top view of a secure public storage cabinet according to an embodiment of the invention.
Figure 11:
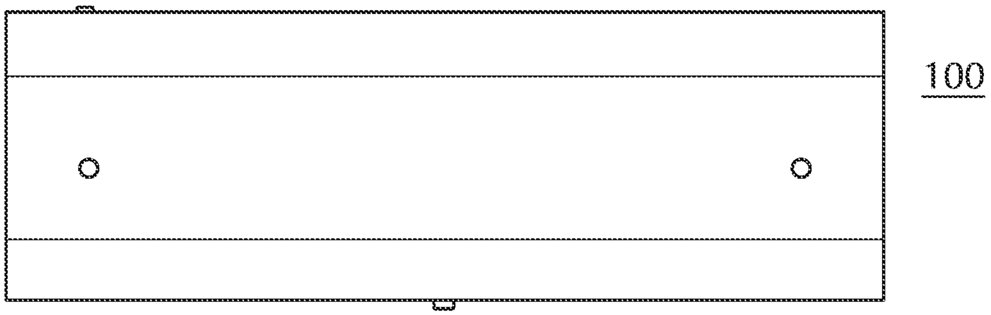
FIG. 11 is a bottom view of a secure public storage cabinet according to an embodiment of the invention.

In such embodiments, different trays may be used for storage of different medications and/or devices. For example, FIG. 5 depicts a top view of a tray 114 designed to hold boxes (not pictured) in which Narcan® nasal sprays are distributed. For another example, FIG. 6 depicts a top view of a tray 116 designed to hold emergency autoinjectors (e.g., EpiPen®) in an upright position. These examples are not limiting; suitably designed trays may be used in the same way to hold other desired medication containers and/or dispensers.

As depicted, the trays 114, 116 (FIGS. 5 & 6) have holes 505 in their bottoms that may correspond to holes 410 (FIG. 4), e.g., in a horizontal shelf 414 within the body 142 of the cabinet 100. In an embodiment of the invention, screws (not pictured) may be threaded through the holes 410, 505 (FIGS. 4-6) and tightened to secure the trays 114, 116 within the storage compartment 110 of the cabinet 100. According to alternative embodiments (not pictured), trays may be configured, e.g., to slide or snap into place within the body 142 of a cabinet 100.

FIGS. 7-11 are, respectively, front, left side, right side, top, and bottom views of a cabinet 100, according to an embodiment of the invention, with the cover in a closed position. In one such embodiment, the rear of the cabinet may be, e.g., plain and unornamented.

Figure 12:
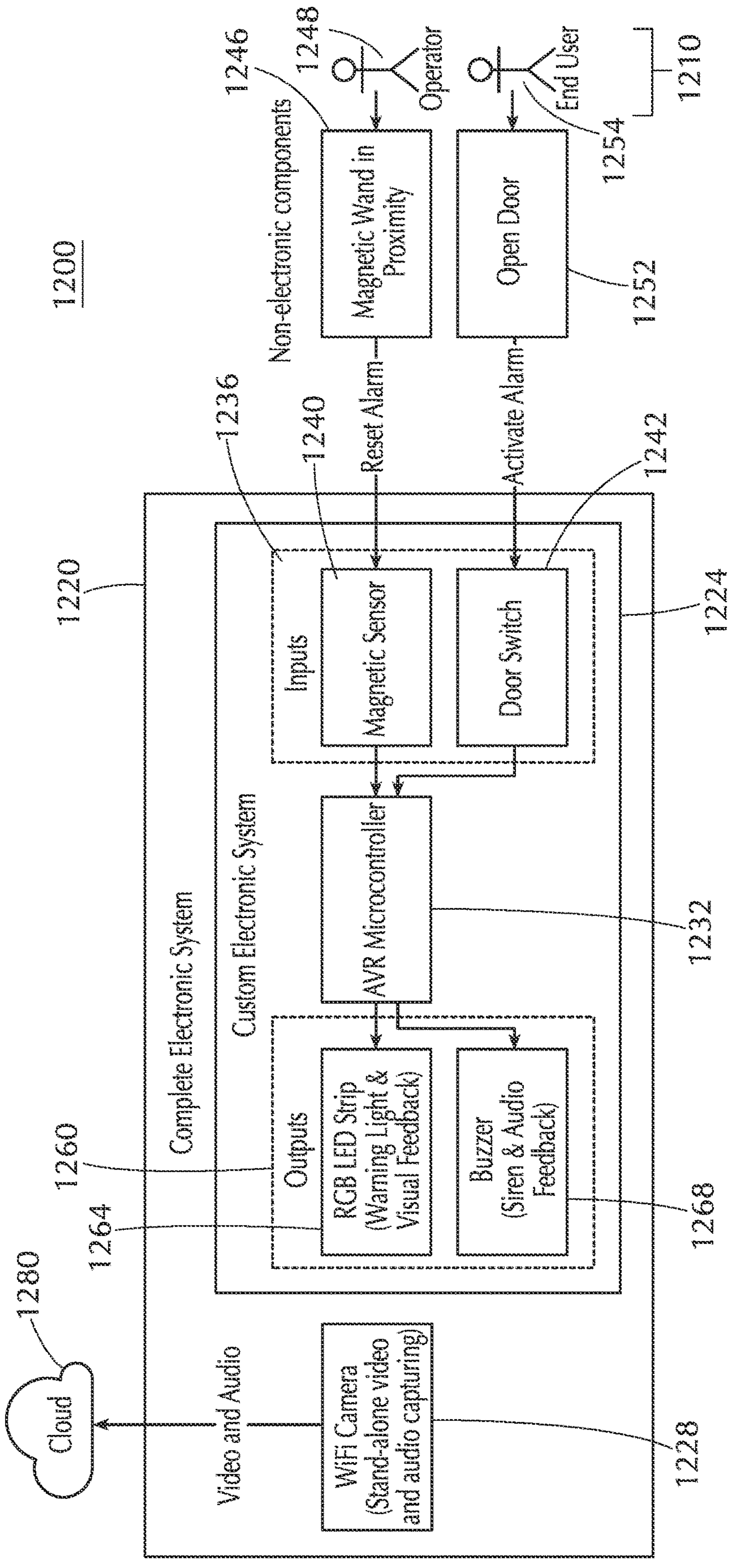
FIG. 12 depicts conceptually components and systems within a cabinet according to an embodiment of the invention.

FIG. 12 is a block diagram 1200 that depicts conceptually components and systems associated with a cabinet according to an embodiment of the invention. To better illustrate components and their functions according to such an embodiment, some are depicted in relation to persons 1210 such as, e.g., a user or operator of the cabinet. It should be emphasized, however, that this depiction is solely illustrative; neither this depiction nor anything else in this disclosure or the claims should be taken to mean that any invention or any claim in this document is directed to or encompasses a human organism in whole or in part.

As FIG. 12 depicts, a cabinet according to an embodiment of the invention may comprise one or more electronic systems or subsystems. For convenience, they are called collectively the "complete electronic system" 1220. (In this disclosure, except where the context requires, the terms "system" and "subsystem" are used interchangeably except when referring to the complete electronic system 1220.) It will be appreciated, however, that the complete electronic subsystem 1220 according to embodiments of the invention may actually encompass multiple electronic subsystems and, depending on the embodiment, these subsystems may or may not be related in ways that go beyond inclusion in, or association with, a single cabinet.

For example, in an embodiment such as FIG. 12 depicts, the complete electronic system 1220 may include a custom electronic system 1224 and an audio/video system 1228.

According to embodiments of the invention, the custom electronic system 1224 may include, e.g., a microcontroller 1232 such as an AVR® or other microcontroller. The microcontroller 1232 may accept inputs, e.g., from one or more sensors 1236. In an embodiment such as FIG. 12 depicts, these sensors may include, e.g., a magnetic sensor 1240 and a door switch 1242 (which may correspond, e.g., to the mechanical switch 150 of FIG. 1). The magnetic sensor 1240 in an embodiment may detect, e.g., a magnetic wand 1246 when an operator 1248 brings the wand in proximity to the sensor 1240, e.g., to reset an alarm. The door switch 1242 may in an embodiment detect that a user 1242 has opened the door 1252 of the cabinet, which may, e.g., trigger an alarm.

The microcontroller 1232 may also in embodiments of the invention control one or more output devices 1260. For example, as FIG. 12 depicts, these output devices 1260 may include, e.g., an RGB LED strip 1264 (which may correspond, e.g., to the LEDs discussed in connection with FIG. 1) and a buzzer, loudspeaker, or other audio output device or subsystem 1268 (which may correspond, e.g., to the audio output device 214 of FIG. 2).

In an embodiment such as FIG. 12 depicts, the complete electronic system 1220 may include an audio/video system 1228. According to embodiments of the invention, the audio/video system 1228 may or may not be distinct from the custom electronic system 1224. For example, the audio/video system 1228 may in an embodiment of the invention neither provide input to, or accept output from, the microcontroller 1232 or other components or subsystems of the custom electronic system 1224. In one such embodiment, the custom electronic system 1224 and the audio/video system 1228 may draw electrical power from a common source; in an alternative embodiment, they may be powered separately.

For example, in an embodiment of the invention, the audio/video system 1228 may be a standalone unit, e.g., a wireless security camera such as the Tuya PS4 WiFi smart security camera. Such a standalone unit may include, e.g., a motion sensor, camera, microphone, and speaker, and it may, e.g., connect to the internet via a Wi-Fi® connection specific to the standalone unit. In such an environment, the motion sensor may detect, e.g., the motion of the cabinet door when it is opened and/or the motion of a user 1254 accessing the contents of a cabinet. In response, the audio/video system may, e.g., record audio and/or video and transmit it via the Wi-Fi® connection, e.g., to a remote computer system, which may in response create a persistent, remote record of when the cabinet was opened and who accessed the contents of the cabinet.

In embodiments of the invention, the complete electronic system 1220 may be powered, e.g., by mains power, by batteries, or both. In embodiments providing both mains and battery power, the batteries may, e.g., serve as a backup to the mains power. In such embodiments, for example, the batteries may be charged by mains power when available and then provide power when mains power is absent. In embodiments that use batteries for power, the custom electronic system 1224 and audio/video system 1228 may be powered by a common set of batteries or individually by separate sets of batteries.

For example, in one embodiment of the invention, the custom electronic system may be powered by two lithium 18650 batteries (not pictured), and the audio/video system may be powered separately by two more 18650 batteries (not pictured). In such an embodiment, battery life may be approximately one year, with variation due to conditions including, e.g., usage of the cabinet.

The custom electronic system 1224 may implement several kinds of behavior, e.g., to promote the security of the cabinet contents and other purposes. The different kinds of behavior may be associated with one or more states of the custom electronic system 1224. The particular state may be reflected, e.g., in the state of one or more of the output devices 1260, and transitions between states may be effected by, e.g., input data generated by the input devices 1236, passage of time, and/or other actions and circumstances.

Figure 13:
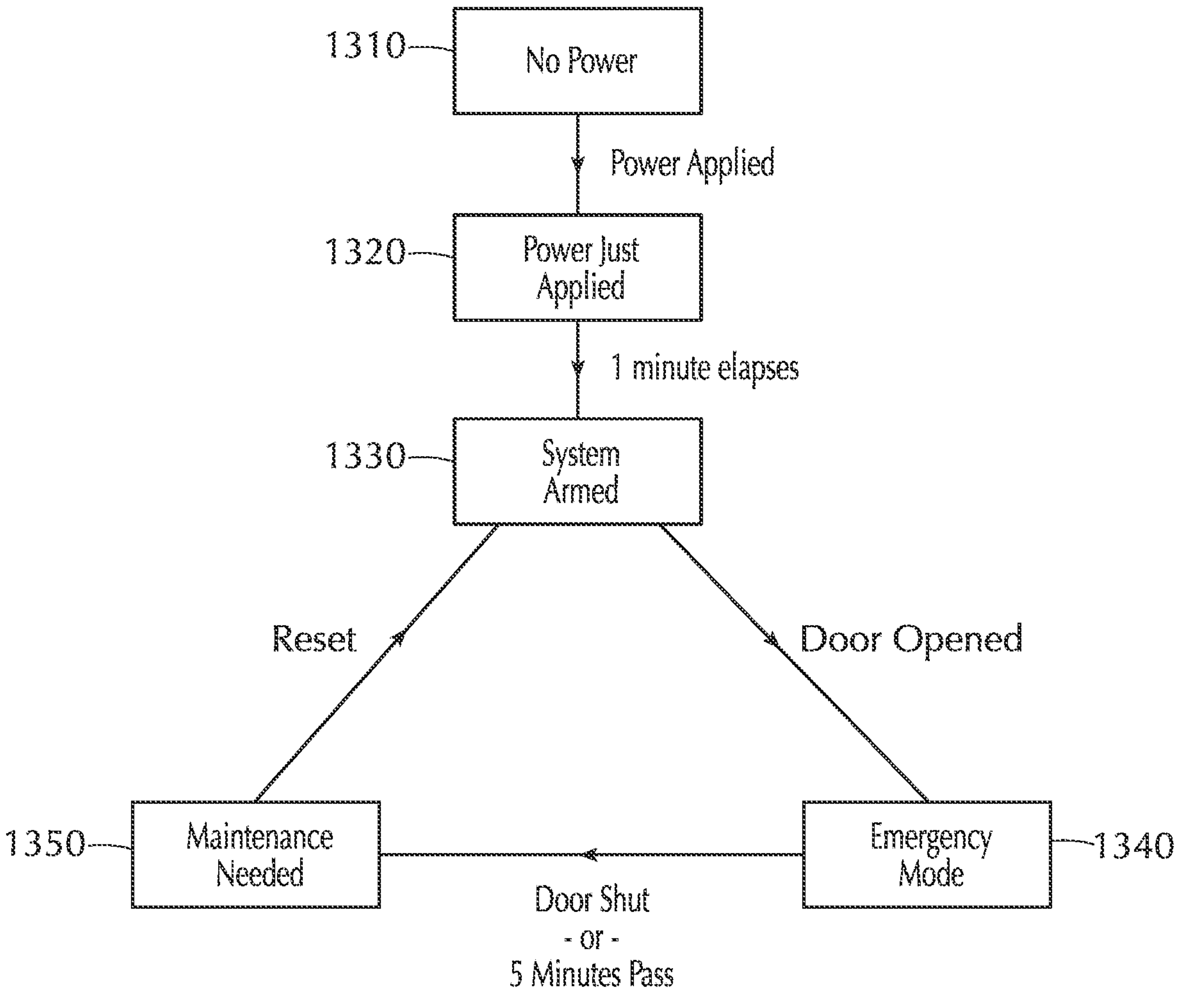
FIG. 13 depicts states and transitions of an electronic system within a cabinet according to an embodiment of the invention.

FIG. 13 is a diagram that reflects the different states 1300 of the custom electronic system 1224 (FIG. 12) and the transitions between states according to one exemplary embodiment of the invention. In an initial state 1310, the system is inactive, reflecting the lack of power supply. It will be appreciated that the system may be returned from any other state to this state trivially, e.g., by disconnecting the power supply, but these transitions are not depicted to avoid cluttering the diagram.

When power is supplied, the system in the depicted embodiment enters a pre-arming state 1320. In the pre-arming state 1320, the microcontroller 1232 (FIG. 12) may, e.g., complete a bootstrapping process. Once bootstrapped, the microcontroller 1232 may carry out instructions encoded, e.g., in non-volatile storage within the microcontroller 1232 to cause the system to exhibit the behavior and transitions described below.

The pre-arming state 1320 (FIG. 13) may also persist for a preset time. For example, in an embodiment of the invention, the system may remain in the pre-arming state 1320 for one minute, e.g., to permit an operator to complete certain tasks before the system is armed. For example, in an embodiment, replacing batteries may involve removing the cabinet from a wall or other mounting. An arming delay may provide a window following power-up in which the cabinet may be replaced on its mount.

From the pre-arming state 1320, the system may progress into an armed state 1330. The significance of the armed state in an embodiment of the invention is that the system will then proceed to emergency mode upon detecting that the cabinet door has been opened.

While the cabinet is in the armed state 1330, the cabinet LEDs may provide status information about the cabinet and/or the electronic system. For example, in one embodiment of the invention in which an electronic system is battery-powered, the LEDs may flash, e.g., teal, periodically to indicate that the batteries have a good charge. Flashing orange periodically may indicate that the batteries are low and need replacement or recharging, and a lack of flashing may indicate that the batteries are dead. In an alternative embodiment in which the electronics are powered by mains power, the LEDs may flash, e.g., teal, to indicate that the cabinet is receiving power and orange to indicate that the cabinet is depending on batteries for backup power; a lack of light may indicate that the system is inactive.

As mentioned, opening the cabinet door while the system is armed will in embodiments cause the system to enter emergency mode 1340. In emergency mode 1340, the electronics may cause behavior that may be expected, e.g., to call as much attention as possible to the cabinet. In such an embodiment, this may be desired, e.g., to deter opening when there is no emergency (e.g., to deter theft or vandalism) and/or to summon assistance when there is an emergency.

For example, in embodiments of the invention, when the system is in emergency mode 1340, the LEDs 1264 (FIG. 12) may, e.g., brightly flash red. In various embodiments, this flashing may have a higher frequency than the flashing in the armed state 1330 (FIG. 13), or it may flash more brightly, or both. Instead of this flashing or in addition to it, the LEDs may in this state, e.g., provide consistent illumination of the storage compartment 110 (FIG. 1) and/or its contents to make access easier and safer. (In an alternative embodiment, such consistent illumination may be provided, e.g., any time the cover 140 is open, regardless of whether the system is in emergency mode 1340 (FIG. 13).)

In embodiments of the invention, when the system is in emergency mode 1340, the audio output device or subsystem 1268 (FIG. 12) may emit, e.g., a loud siren.

As disclosed above, opening the cabinet door or otherwise moving in front of a motion sensor associated with an audio/video system 1228 may active a video camera and/or microphone which may be, e.g., placed and configured to record any person opening the cabinet or accessing its contents. In an embodiment of the invention in which the audio/video system 1228 is distinct from the custom electronic system 1224, this audio recording may be triggered, e.g., only by the motion sensor and be totally independent of whether the system is in emergency mode 1340 (FIG. 13).

In embodiments of the invention, the system may remain in emergency mode 1340, e.g., for a set time, or until certain input is received, or both. For example, according to an embodiment of the invention, the system may remain in emergency mode 1340—emitting light and sound—for 20 minutes, or until the door is closed again, or until an operator presents, e.g., a magnetic reset wand in proximity to a magnetic sensor 1240 (FIG. 12).

It will be appreciated that it may be desirable for an operator to attend to a cabinet according to embodiments of the invention after the cabinet has been opened. For example, it may be desirable to restock medications, or at least to confirm that they are present and untampered with, and/or to replace a tamper-evident seal.

Thus, upon leaving emergency mode 1340, a system according to embodiments of the invention may enter a maintenance-needed state 1350. In this state 1350, audio and/or visual signals may be provided as reminders that it might be appropriate for an operator to attend to the cabinet. For example, according to an embodiment of the invention, the system in maintenance-needed state may emit, e.g., a siren for 20 minutes after leaving emergency mode 1340. This siren may be, but need not be, different from the siren emitted during emergency mode 1340.

According to embodiments of the invention, in addition to or instead of a siren as above, a system in maintenance-needed state 1350 may, e.g., cause LEDs 1264 (FIG. 12) to flash orange, e.g., every 10 seconds, for, e.g., up to 3 days following the exit from emergency mode 1340.

The system may in embodiments of the invention remain in maintenance-needed state 1350 until an operator presents, e.g., a magnetic reset wand in proximity to a magnetic sensor 1240 (FIG. 12). The system may remain in this state 1350 (FIG. 13), pending reset, even after the audio and/or visual signals have ceased. Following reset with the magnetic wand, a system according to an embodiment of the invention may return to the armed state 1330. In an embodiment of the invention, the system may not return to the armed state 1330 until the door is closed again.

Figure 14:
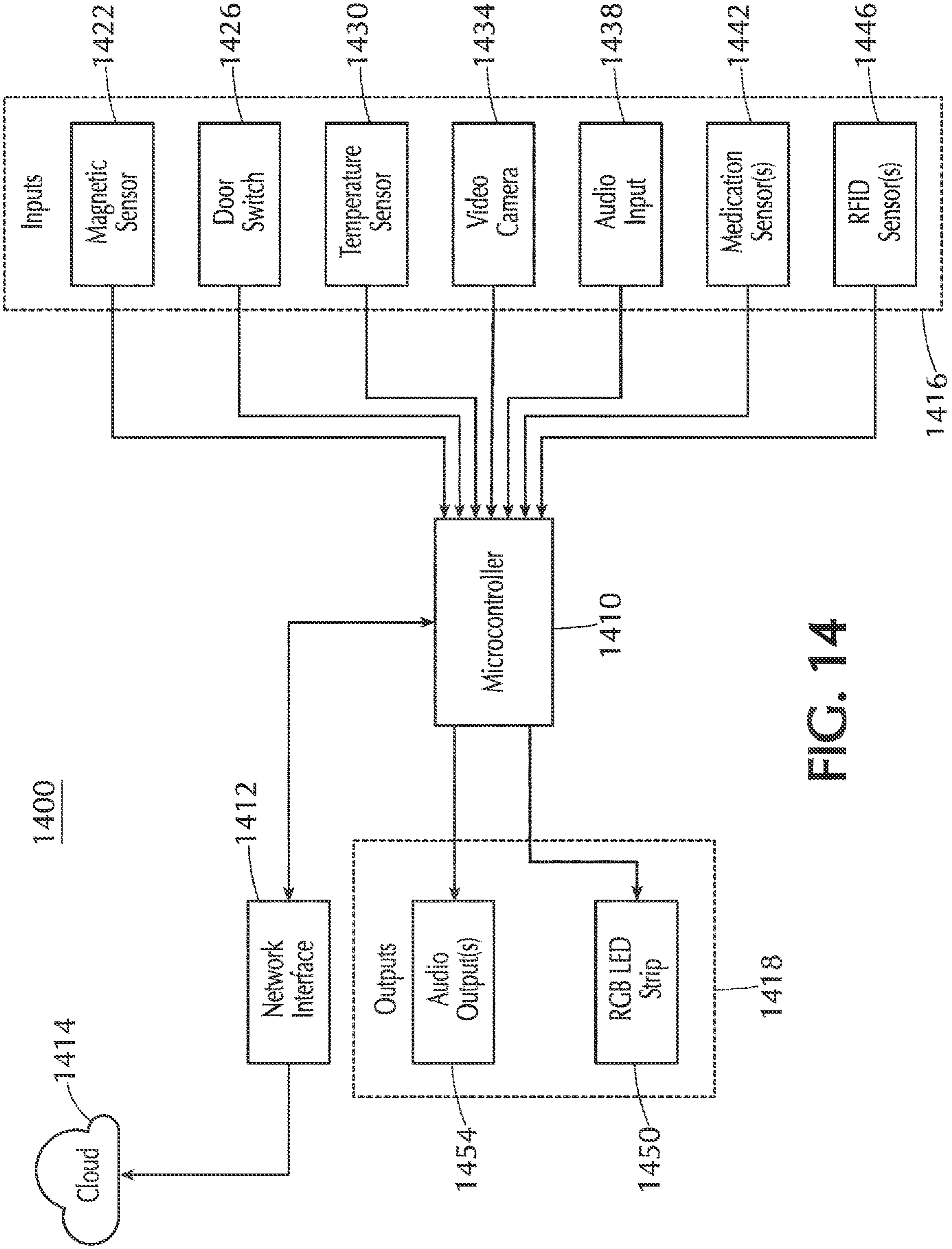
FIG. 14 depicts conceptually components and systems within a cabinet according to embodiments of the invention.

Alternative embodiments of the invention may support, e.g., additional and/or more complex functions than the one discussed above. FIG. 14 depicts conceptually components and systems 1400 within a cabinet according to alternative embodiments of the invention.

According to an embodiment as FIG. 14 depicts, a microcontroller 1410 is provided. The microcontroller 1410 is coupled directly or indirectly to a network interface 1412, which may allow the system 1400 to communicate, e.g., with one or more other systems via the internet 1414. The network interface 1412 may be, e.g., a Wi-Fi® interface.

The microcontroller 1410 is also coupled directly or indirectly to a plurality of input devices 1416 and a plurality of output devices 1418. The microcontroller is also coupled directly or indirectly to It will be appreciated that the microcontroller may be connected to some or all of the devices via, e.g., one or more buffers or interfaces (e.g., a USB controller), although they are omitted from FIG. 14 for clarity.

As depicted, the input devices 1414 may include, e.g., a magnetic sensor 1422, a door switch 1426, a temperature sensor 1430, a video camera 1434, an audio input 1438, one or more medication sensors 1442, and/or one or more RFID sensors 1446. Embodiments of the invention may include one or more input devices in addition to and/or instead of one or more of the listed input devices.

In an embodiment of the invention, a magnetic sensor 1422 in FIG. 14 may serve, e.g., a function similar to that of the magnetic sensor 1240 of FIG. 12. That is, the magnetic sensor 1422 (FIG. 14) may permit an operator with a magnetic wand to reset the system 1400. The door switch 1426 of FIG. 14 may also serve a function similar to the door switch 1242 of FIG. 12, viz., providing a signal to the microcontroller 1410 (FIG. 14) indicating whether the cabinet's cover is open or closed.

A temperature sensor 1430 may be installed, e.g., within the cabinet, making temperature readings available to the microcontroller 1410. These measurements may be used, e.g., to determine whether the contents of the cabinet have been stored within safe limits.

A video camera 1434 and audio input (e.g., microphone) 1438 may be present and serve similar functions to the audio/video system 1228 of FIG. 12. Rather than being part of a standalone system as in FIG. 12, however, in an embodiment such as FIG. 14 depicts, the camera 1434 and/or microphone 1438 may be coupled, e.g., to the microcontroller 1410. The audio and video may be, e.g., streamed live to one or more remote servers via the network 1414 and/or stored locally for subsequent upload and/or download.

In connection with an embodiment of the invention, facial recognition techniques may be applied, e.g., by the microcontroller 1410, one or more of the remote servers, and/or by other systems, to identify any person opening the cabinet. The results of any such facial recognition may be included, e.g., in any data preserved for audit purposes, and/or for other purposes.

According to embodiments of the invention, one or more medication sensors 1442 may be provided. For example, medication trays 114, 116 such as FIGS. 4-6 depict, may be configured with, e.g., electromechanical switches (not pictured). According to embodiments, one or more of these switches may be disposed within each space or well that is configured to hold a medication container or device, such that the switch or switches may indicate the presence and/or absence of a container or device in the space or well.

For example, a spring-loaded switch may be disposed at the bottom of each well such that the switch may be activated (or deactivated) by the weight of a container placed in the well. Alternatively, for example, a switch may be disposed in the side of each well such that placing a container or device in the well presses the switch to the side, thereby activating (or deactivating) it, and removal of the container allows the switch to return to its original state.

Other kind of sensors, such as, e.g., magnetic sensors, may serve similar functions in some or all wells, detecting the presence or absence of suitable (or suitably prepared) medication containers and/or devices.

In an embodiment of the invention that includes, e.g., one or more removable trays 114, 116 (FIGS. 4-6) some or all of the trays may include, e.g., a modular electrical connector or connectors (not pictured), corresponding to connectors (not pictured) in the cabinet, such that the sensors may be electrically coupled to the microcontroller 1410 (FIG. 14) when a new tray is installed.

Instead of the medication sensors 1442 or in addition to them, one or more RFID sensors 1446 may be provided. In an embodiment of the invention, one or more such sensors may be disposed, e.g., within a tray or trays 114, 116 (FIGS. 4-6) such that they may read an RFID tag or tags, e.g., affixed to or incorporated within medication containers and/or devices when placed within the respective trays. In embodiments of the invention in which the trays 114, 116 include modular electrical connectors, such connectors may also be used to establish connections between the RFID sensors in a tray and the microcontroller 1410 (FIG. 14).

In addition to the above functions, or instead of them, an RFID sensor 1446 may be disposed elsewhere in the cabinet, replacing and/or supplementing the functioning of the magnetic sensor 1422. For example, an operator may possess, e.g., a maintenance card (not pictured) containing an RFID tag, and the device may be, e.g., reset by the operator's bringing the maintenance card into proximity with the appropriate RFID sensor 1446. The approximate location of the RFID sensor 1446 may be, e.g., marked on or within the cabinet.

In an embodiment such as FIG. 14 depicts, the output devices 1418 may include, e.g., one or more lights, such as an RGB LED strip 1450 and/or one or more audio output devices, such as a buzzer or speaker 1454. Embodiments of the invention may include one or more output devices in addition to and/or instead of one or more of the listed output devices. The functions of these output devices may in embodiments of the invention, e.g., parallel the functions of the counterpart devices depicted in FIG. 12.

It will be appreciated that an embodiment such as FIG. 14 depicts may have states and transitions, e.g., as FIG. 13 depicts, with corresponding behavior.

But the additional sensors depicted, e.g., in FIG. 14, may permit recognition of more events than those recognized, e.g., by a system 1200 as FIG. 12 depicts, and the existence of such events and other data may enable the microcontroller 1410 (FIG. 14) to support broader functioning, e.g., than an embodiment without having such sensors coupled to a microcontroller.

It will be appreciated that any input or change of state may be considered an "event", in connection with an embodiment of the invention. Table 1 lists events that may be recognized according to one exemplary embodiment of the invention.

TABLE I

| System Events |
|---|
| Power on |
| Power down |
| System armed |
| Low power/battery |
| Cover open |
| Cover closed |
| Remove container/dispenser |
| Replace container/dispenser |
| Unsealing of container/dispenser |
| Administration of medication |
| Temperature excursion |
| End of temperature excursion |
| Emergency begins |
| Emergency ends |

TABLE I-continued

| System Events |
|---|
| Maintenance-needed state entered |
| Maintenance-needed state left |
| System reset |
| Maintenance card read |

A power on event is just that: the system has just powered up, and initialization of the microcontroller 1410 has proceeded sufficiently that the microcontroller 1410 is capable or recognizing that fact. A power down event may be the converse, indicating, e.g., that a power shutoff switch has been pressed and a shutdown sequence is proceeding. In an embodiment that is powered by batteries, an event may be generated, e.g., if low battery levels are detected.

The system's entry of the armed state may be regarded as an event in an embodiment of the invention. In embodiments of the invention, entry or exit of any or all states, e.g., as FIG. 13 depicts, and/or any or all of the transitions that FIG. 13 depicts may be recognized as events.

Events may be recognized upon, e.g., opening and/or closing of the cabinet's cover and/or removal and/or replacement of a medication container or device. In connection with embodiments of the invention, a container or device may be able to detect and signal, e.g., that the container has been unsealed and/or that medication has been administered. In such embodiments, this unsealing and/or administration may be recognized by the system 1400 (FIG. 14) as events.

Many drugs are temperature sensitive. For example, some drugs degrade when stored outside a specified temperature range. As FIG. 14 depicts, an embodiment of the invention may include, e.g., a temperature sensor 1430, which may allow a system 1400 to detect excursions from an acceptable temperature range and/or return to that range. Either or both of the beginning and end of such an excursion may be regarded as events in connection with an embodiment of the invention. The acceptable temperature range may be set, e.g., by a remote system in communication with the system 1400 via the internet 1414.

(In embodiments of the invention meant, e.g., for installation out of doors, a cabinet according to an embodiment of the invention may include one or more subsystems (not pictured) to regulate the temperature inside the cabinet. For example, one or more thermostatically controlled Peltier elements may be disposed, e.g., within the cabinet to heat and/or cool the interior of the cabinet. One or more other heating and/or cooling elements and/or devices may be disposed within the cabinet.)

Similarly, either or both of entry into the emergency mode and exit from it may be recognized as events in connection with embodiments of the invention. As may be, e.g., entry and/or exit of a maintenance-needed state, a system reset, and/or reading of a maintenance RFID card.

Different events may have different significance according to different embodiments of the invention. In embodiments of the invention, any or all events may be, e.g., logged locally and/or transmitted via the internet 1414 for remote logging. Locally logged events may be, e.g., subsequently uploaded and/or downloaded. An entry in a log may include, e.g., the time and date of the event, the nature of the event, and any other information considered appropriate.

In connection with embodiments of the invention, events may be treated as separate for these purposes even though one event may seem necessarily to imply or subsume another. For example, in some embodiments of the invention as described above, opening the cover may put the system directly and automatically into emergency mode. Nonetheless, in embodiments of the invention, the opening of the cover and the entry into emergency mode may be regarded as the same event or distinct events and, e.g., logged together or separately; the logged indication that the system entered emergency mode may or may not be taken by implication as an indication that the cover was opened. At the least, such separate logging may serve diagnostic and/or auditing purposes.

Embodiments of the invention, as described above, may attract attention in emergencies, increasing the likelihood that persons nearby may investigate the disturbance and offer help. It may be desirable in connection with embodiments of the invention to allow a user to summon assistance directly in an emergency. For example, depending on the circumstances, such assistance could be, e.g., the EMS, but it could also be a school nurse.

Figure 15:
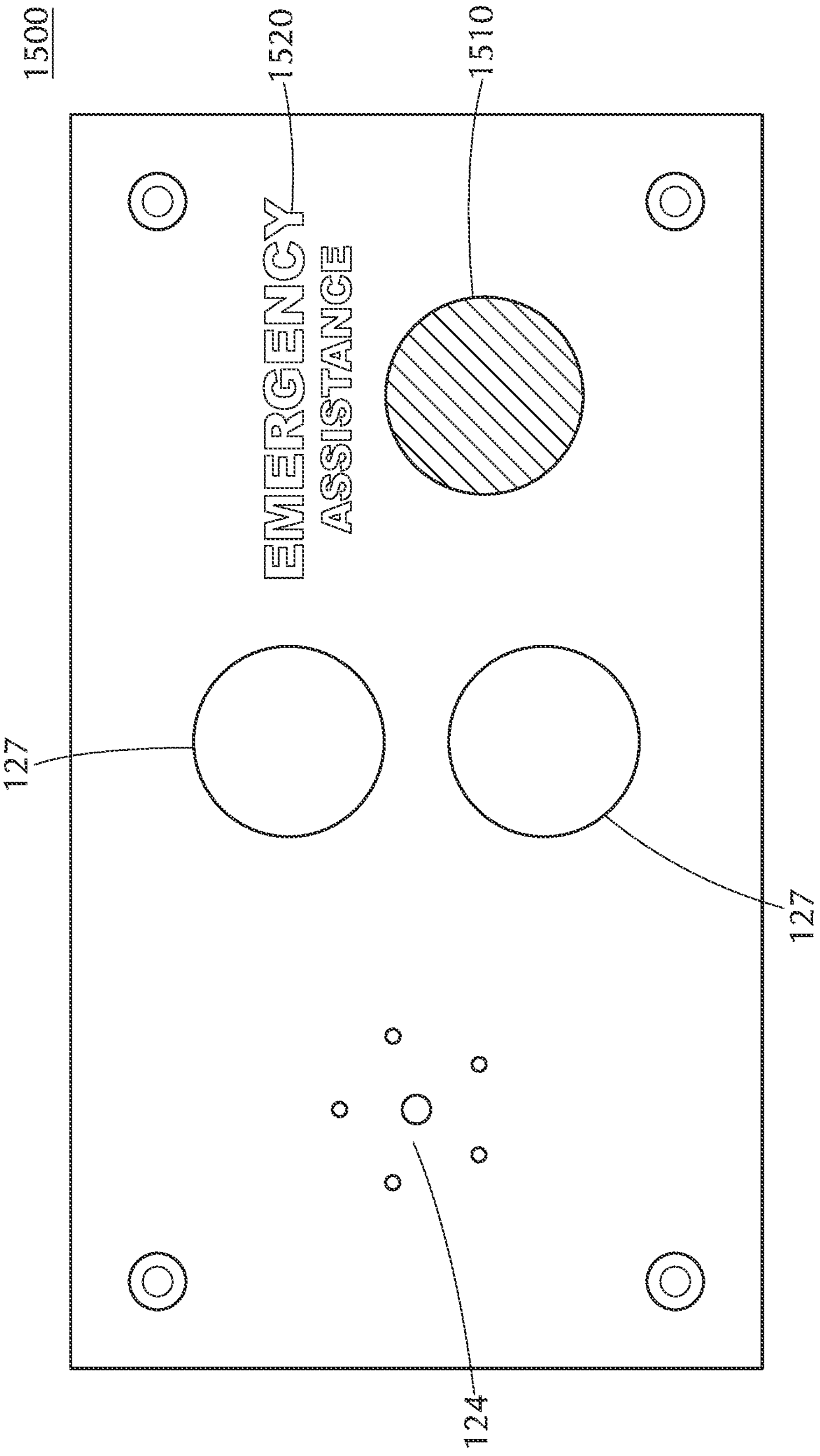
FIG. 15 depicts an interior of a cabinet including an "EMERGENCY ASSISTANCE" button according to an embodiment of the invention.

FIG. 15 depicts a portion 1500 of an embodiment of the invention that may be configured to allow users to request this kind of help. The depicted portion 1500 may correspond, e.g., to a variant of the plate 200 that FIG. 2 depicts. As FIG. 15 depicts, the plate includes a pushbutton 1510 below a label reading, e.g., "EMERGENCY ASSISTANCE". When the user presses the button, help may be summoned depending on the embodiment of the invention.

For example, in an embodiment such as FIG. 12 depicts, a radio or other wired or wireless signaling device (not pictured) may be included and may, like the audio/video system 1228 be distinct from the custom electronic system 1224. Such signaling device may be configured to send a signal to an appropriate responder, e.g., in the manner of a fire alarm that is configured automatically to contact the fire department.

Alternatively, in an embodiment such as FIG. 14 depicts, the microcontroller 1410 may transmit data to a server via the internet 1414 indicating, e.g., the need for emergency assistance. The server may then, e.g., further contact one or more preset sources of assistance.

The invention claimed is:

1. A cabinet for secure public storage of medication, comprising:

- a body comprising a storage compartment, the storage compartment having a front and a bottom;
- one or more trays disposed at the bottom of a storage compartment, each of the trays being configured to hold respectively one or more medication containers;
- a cover movably attached to the body such that the cover has a closed position preventing removal of medication containers from the storage compartment and an open position permitting removal of medication containers from the storage compartment;
- a microcontroller disposed within the body;
- a cover-position sensor disposed within the body and configured to detect whether the cover is or is not in the closed position, the cover-position sensor being operatively coupled to the microcontroller;
- an audio output device operatively coupled to the microcontroller;
- one or more lights operatively coupled to the microcontroller;
- a video camera configured to participate in a data network; and
- a motion sensor operatively coupled to the video camera, the motion sensor configured to detect motion of the cover and/or motion in front of the cabinet,
- wherein the video camera is configured to be activated upon detection of motion by the motion sensor and, while active, to transmit still and/or moving images via the electronic data network.

2. The cabinet of claim 1, wherein the microcontroller is programmed at least to:

- recognize an armed state and an emergency mode;
- transition from the armed state to the emergency mode upon receipt, while in the armed state, of input from the cover-position sensor indicating that the cover is in the open position; and
- while in the emergency mode, cause the audio output device to emit a siren and cause the lights to flash brightly.

3. The cabinet of claim 2, wherein the microcontroller is programmed at least to:

- recognize a maintenance-needed state;
- transition from the emergency mode to the maintenance-needed state upon, while in the emergency mode, an event occurring from the group consisting of
  - elapsing of a preset time since entry of emergency mode, and
  - receiving input from the cover-position sensor indicating that the cover is in the closed position;
- wherein, upon entry into the maintenance-needed state,
  - the audio output device ceases to emit the siren of the emergency mode,
  - the lights cease the bright flashing of the emergency mode, and
  - the cabinet emits one or more visual and/or auditory signals indicating the maintenance-needed state, the visual and/or auditory signals being perceptibly distinct from the siren of the emergency mode and the bright flashing of the emergency mode.

4. The cabinet of claim 3, comprising a magnetic sensor operatively coupled to the microcontroller and configured to detect a magnetic wand in proximity to the cabinet, wherein the microcontroller is programmed at least to transition from the maintenance-needed state to the armed state upon receiving, while in the maintenance-needed state, input indicating that the magnetic sensor has detected the magnetic wand.

5. The cabinet of claim 2, comprising a magnetic sensor operatively coupled to the microcontroller and configured to detect a magnetic wand in proximity to the cabinet, wherein the microcontroller is programmed at least to:

- recognize a maintenance-needed state;
- transition from the emergency mode to the maintenance-needed state upon, while in the emergency mode, an event occurring from the group consisting of
  - elapsing of a preset time since entry of emergency mode,
  - receiving input indicating that the magnetic sensor has detected the magnetic wand, and
  - receiving input from the cover-position sensor indicating that the cover is in the closed position;
- wherein, upon entry into the maintenance-needed state,
  - the audio output device ceases to emit the siren of the emergency mode,
  - the lights cease the bright flashing of the emergency mode, and
  - the cabinet emits one or more visual and/or auditory signals indicating the maintenance-needed state, the visual and/or auditory signals being perceptibly distinct from the siren of the emergency mode and the bright flashing of the emergency mode.

6. The cabinet of claim 5, wherein the microcontroller is programmed at least to transition from the maintenance-needed state to the armed state upon receiving, while in the maintenance-needed state, input indicating that the magnetic sensor has detected the magnetic wand.

7. The cabinet of claim 1, wherein at least one of the trays is modular and removably fastened to the body.

8. The cabinet of claim 7, wherein the microcontroller is programmed at least to:

recognize an armed state and an emergency mode;

transition from the armed state to the emergency mode upon receipt, while in the armed state, of input from the cover-position sensor indicating that the cover is in the open position; and while in the emergency mode, cause the audio output device to emit a siren and cause the lights to flash brightly.

9. The cabinet of claim 8, comprising a magnetic sensor operatively coupled to the microcontroller and configured to detect a magnetic wand in proximity to the cabinet, wherein the microcontroller is programmed at least to:

recognize a maintenance-needed state;

transition from the emergency mode to the maintenance-needed state upon, while in the emergency mode, an event occurring from the group consisting of elapsing of a preset time since entry of emergency mode, receiving input indicating that the magnetic sensor has detected the magnetic wand, and receiving input from the cover-position sensor indicating that the cover is in the closed position;

wherein, upon entry into the maintenance-needed state, the audio output device ceases to emit the siren of the emergency mode, the lights cease the bright flashing of the emergency mode, and the cabinet emits one or more visual and/or auditory signals indicating the maintenance-needed state, the visual and/or auditory signals being perceptibly distinct from the siren of the emergency mode and the bright flashing of the emergency mode.

10. The cabinet of claim 9, wherein the microcontroller is programmed at least to transition from the maintenance-needed state to the armed state upon receiving, while in the maintenance-needed state, input indicating that the magnetic sensor has detected the magnetic wand.

11. The cabinet of claim 1, comprising a temperature sensor operatively coupled to the microcontroller, wherein the microcontroller is programmed at least to detect a temperature excursion comprising measurement by the temperature sensor of a temperature outside a preset range.

12. The cabinet of claim 11, wherein the microcontroller is programmed at least to, upon detection of the temperature excursion, cause the cabinet to emit a first one or more visual and/or auditory signals indicating the temperature excursion.

13. The cabinet of claim 12, wherein the microcontroller is programmed at least to:

detect termination of the temperature excursion;

following the detection of the termination of the temperature excursion, cause the cabinet to emit a second one or more visual and/or auditory signals indicating the termination of the temperature excursion, some or all of the first one or more visual and/or auditory signals being the same as, or different from, some or all of the second one or more visual and/or auditory signals.

14. The cabinet of claim 11, comprising a network interface operatively coupled to the microcontroller, wherein the microcontroller is programmed at least to:

participate in an electronic data network via the network interface;

communicate via the electronic data network with at least one server; and upon detection of the temperature excursion, transmit to the at least one server data indicating the temperature excursion.

* * * * *